(No Model.)
G. R. HOWELL.
CAN OPENER.
No. 602,757. Patented Apr. 19, 1898.
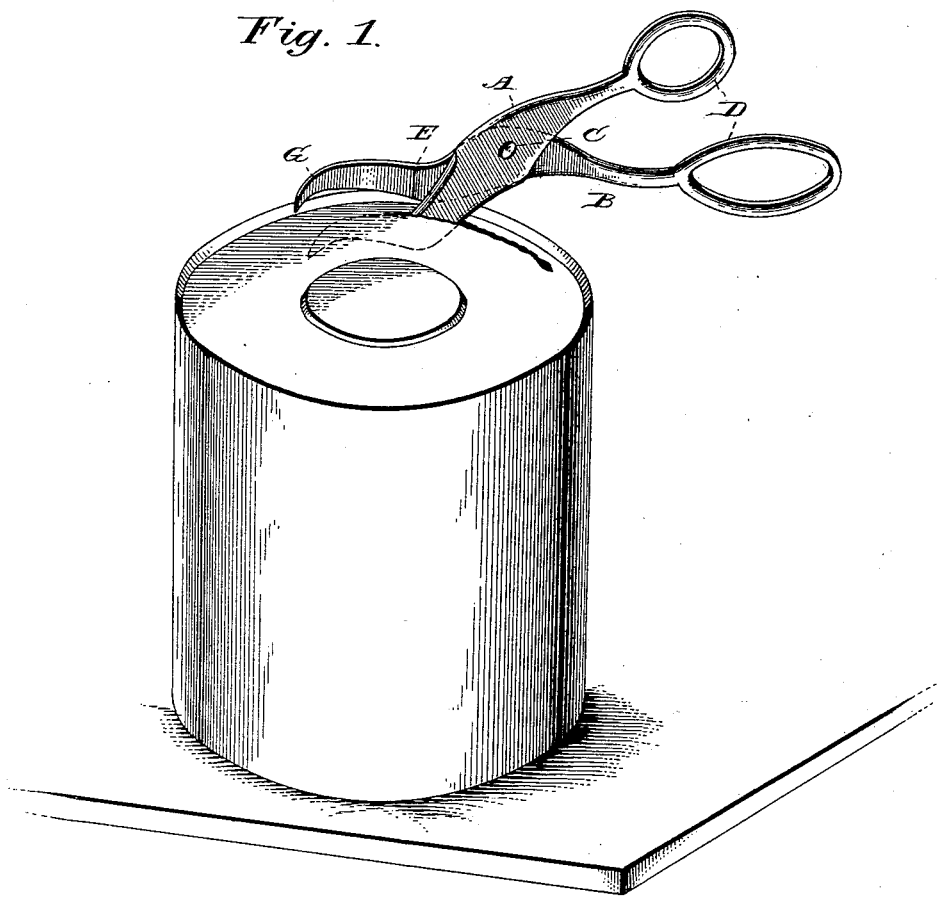
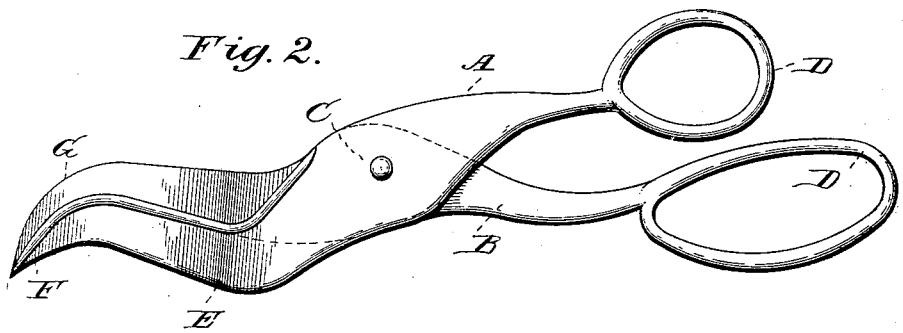
Witnesses
J. F. Cross
Chas. E. Brock
Inventor
George R. Howell,
by Munn & Co.
Attorneys

UNITED STATES PATENT OFFICE.

GEORGE R. HOWELL, OF SOUTHAMPTON, NEW YORK.

CAN-OPENER.

SPECIFICATION forming part of Letters Patent No. 602,757, dated April 19, 1898.

Application filed May 8, 1897. Serial No. 635,703. (No model.)

*To all whom it may concern:*

Be it known that I, GEORGE R. HOWELL, residing at Southampton, in the county of Suffolk and State of New York, have invented certain new and useful Improvements in Can-Openers, of which the following is a specification.

My invention relates to can-openers; and the object thereof is to provide a cheap and simple arrangement by which the opener can be easily inserted in the can to start the cut and then easily operated to remove the top.

My invention consists, essentially, of a pair of cutting-blades hinged together similar to a pair of scissors and each provided with a downwardly-projecting point by which the blades can be inserted in the can. The blades are also, preferably, bent to conform to the contour of the can.

In order that my invention may be fully understood, I will proceed to describe the same with reference to the accompanying drawings, in which—

Figure 1 is a view showing the practical application of my invention. Fig. 2 is a slightly-enlarged view of the opener.

In the said drawings, A and B represent the two cutting-blades hinged together, as at C, and provided on one of their ends with the hinged openings D, by which they are operated. The hinge C is preferably at a point where a large amount of leverage can be given the cutting-blades. Each blade is formed with the bend E, so that when the device is in operation the operating-handles are in a horizontal position, and with the downwardly-projecting point F, which enables the blades to be easily pushed in the can to start the cutting. The cutting part of the blade is also slightly curved for a portion of its length, as indicated at G, so as to conform to the contour of the can.

The operation of my device will be readily understood. The ends are forced into the can to start the cut. One blade is then withdrawn and the handles turned to a horizontal position, and they are then operated, like a pair of scissors, to cut the tin.

Having thus fully described my invention, what I claim as new, and desire to secure by Letters Patent, is—

A pair of can-opening shears comprising two blades and handles pivotally secured together, said blades being projected downwardly, forward and again downwardly from the pivot to the point, and also curved laterally to conform to the curvature of the body of the can, substantially as described.

GEORGE R. HOWELL.

Witnesses:
A. L. MORRELL,
CHARLES G. HOWELL.